Nov. 14, 1933.                C. W. IBACH                1,935,244
AUTOMATIC HOSE COUPLING
Filed Sept. 24, 1931
Fig. 1.
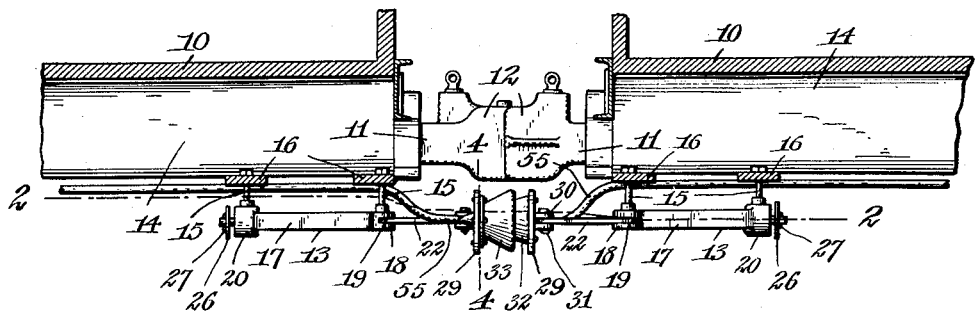
Fig. 2.
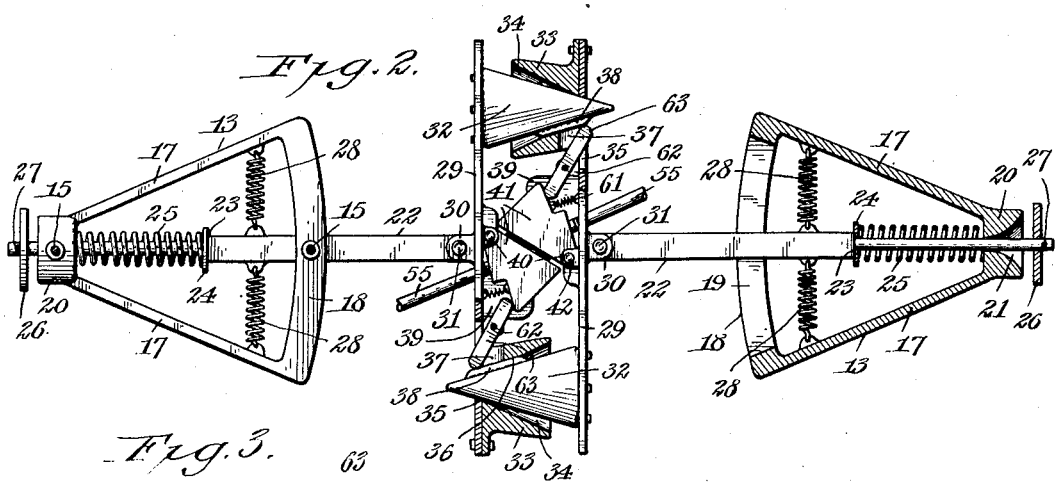
Fig. 3.
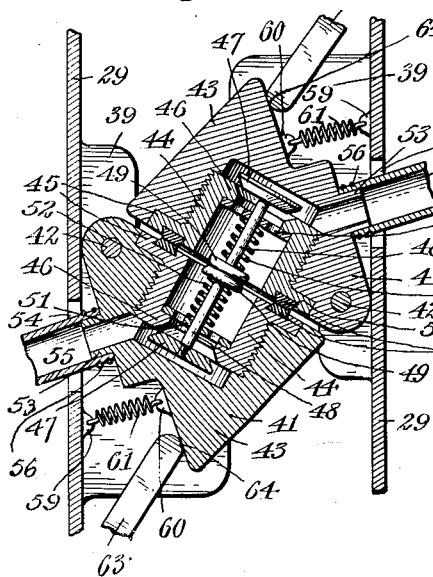
Fig. 4.
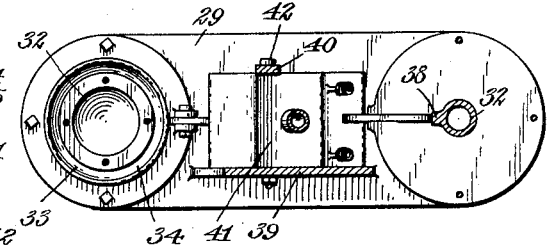
Fig. 5.   Fig. 6.
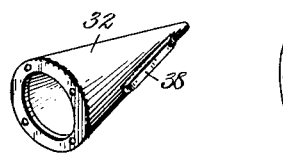  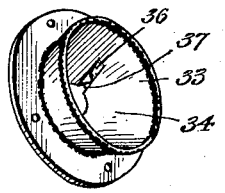
Charles W. Ibach, Inventor
By Emil Hubbart, Attorney.
Witness:
J. J. Oberst, Patented Nov. 14, 1933

1,935,244

UNITED STATES PATENT OFFICE 1,935,244

AUTOMATIC HOSE-COUPLING

Charles W. Ibach, North Evans, N. Y.

Application September 24, 1931
Serial No. 564,845

6 Claims. (Cl. 285—58)

My invention relates to improvements in automatic hose couplings for railway trains or the like, adapted for coupling or connecting together steam or air hose applied to individual cars of a railway train.

One of the objects of my invention is the provision of an automatic conduit coupling adapted to be arranged in close proximity to the car couplers of railway cars, so that upon coupling the cars, the air or steam conduit of adjoining cars will be automatically coupled, and so then when uncoupling the cars, said conduits will be automatically separated or uncoupled and the conduit coupling members positioned for coupling operation without in any manner requiring trainmen or other operators to pass between adjoining cars for coupling or uncoupling the same.

Another object of my invention is the provision of automatic coupling devices for air or steam conduits applied to railway cars, wherein the coupling heads of the hose lengths underneath the car have their co-acting faces obliquely disposed so that upon bringing two cars together, these faces will be brought into contact with each other.

A further object of my invention is the provision of means for automatically coupling the conduits or hose on two cars together, regardless of the position of said cars relatively; suitable mechanism being provided to support the coupling heads and enable such mechanism with the coupling heads to self-adjust themselves, even though the cars are disposed at an angle to each other at the time of coupling them together.

A still further object of my invention is to provide automatic hose coupling mechanism, including coupling heads movably supported, and means for forcing said coupling heads together upon approach of the cars, one with respect to the other.

With the above and other objects in view, to appear hereinafter, the invention consists in the novel features of construction, and in the arrangement and combination of parts to be hereinafter described and more particularly pointed out in the subjoined claims.

In the drawing:

Fig. 1 is a longitudinal section through portions of two cars coupled together and having my invention illustrated as applied thereto.

Fig. 2 is a horizontal section taken on line 2—2, Fig. 1.

Fig. 3 is an enlarged horizontal section through the coupling heads and portions of the header plates supporting the same.

Fig. 4 is an enlarged transverse section, taken on line 4—4, Fig. 1.

Fig. 5 is a detached perspective view of one of the conical male guide members forming part of the invention.

Fig. 6 is a detached perspective view of one of the female guide members.

Now particularly describing my invention in the embodiment thereof illustrated, the reference numeral 10 designates portions of two car bodies, provided with the usual draw-bars 11 having coupling heads 12 of conventional form at their outer ends, shown coupled together in Fig. 1. These coupling heads, or couplers as generally referred to, become automatically coupled together as the adjacent ends of two cars are brought in close proximity to each other, and they have associated therewith means (not shown but understood by those familiar with the art) accessible from the side of the car and operable to permit disconnection of the couplers when one car is to be uncoupled from the other.

My invention is so disposed with reference to the car coupling mechanism, that automatic coupling and uncoupling of the conduits or hose of adjacent cars takes place simultaneously with the coupling and uncoupling of the cars; and to this end I arrange under opposite ends of each car, segment-like or triangular guide frames 13; each guide frame being arranged underneath the draw-bar 11 at the same end of the car and being supported from the body of the car.

As is common in railway construction, the draw-bars are disposed between two longitudinal sills of the car, designated 14 in the drawing, and in the particular construction shown, the segment-like guide frames 13 are supported by hanger-bolts 15 secured in cross-plate 16 fastened to the under side of two or more sills 14; but they may be otherwise supported, if desired.

Said guide frames 13 are therefore immovably applied to the under side of a car body, and this may be accomplished in any desired manner. Each guide frame, by reason of its substantially triangular formation, tapers toward the center of the car body and comprises inwardly converging side members 17 connected at their wide or outer ends by cross members 18, in which a slot 19 is formed, and at its narrow or inner end with a head 20 in which an opening 21 is formed, the opening preferably flaring inwardly or toward the center of the car.

Slidably and oscillatably mounted in each of the guide frames is a supporting rod 22, which is rectangular in cross section along its outer portion and provided with a cylindrical portion at its inner end to form a shoulder 23 on said rod between the ends thereof. Bearing against said shoulder is a plate or washer 24, and surrounding the cylindrical portion of the supporting rod 22 and bearing at one end against said plate or washer 24 is a helical spring 25, the opposite end of which bears against the head 20. The spring therefore tends at all times to force said rod outwardly. A stop washer 26 is applied to the inner end of the rod and is normally in contact with the inner end of the guide frame, said washer being retained on the rod by a pin 27, or otherwise.

The cylindrical portion of said supporting rod extends through the flaring opening 21 at the inner end of the guide frame, and within the guide frame are two retractile springs 28, each of which has one end secured to the supporting rod 22 and its other end to a side member 17 of said guide frame, said springs serving to maintain the supporting rod in central position within the guide frame.

Pivotally connected to each of the supporting rods 22 is a header plate 29 having a pair of lugs 30 on its inner side, between which the outer end of the co-acting supporting rod 22 is fitted, a pivot pin 31 being passed through the lugs 30 and said supporting rod for the purpose of pivotally supporting the header plate, which may be swung horizontally on said supporting rod and be carried laterally with the rod as the latter is moved sidewise in the guide frame while fulcrumed in the flaring opening 21 at the inner end of said frame. These header plates are adapted to approach each other when two adjoining cars are being coupled together, and each plate is provided with what may be termed male and female guide members, designated, respectively, by the numerals 32 and 33. These guide members may be cast integral with the header plates, or be secured thereto as shown in the drawing, and they are so disposed that the header plate at each end of a car will be brought into such relation with the header plate at the adjacent end of an adjoining car that the male guide member of one plate will always be alined with the female guide member of the other plate, assuming both cars to be in true alinement on a straight stretch of track.

The female guide member is preferably in the form of a casting bolted to the header plate and provided with an outwardly-flaring opening 34, which has its inner or small end opening through an opening 35 in the header plate; the opening 34 having a groove 36 extending along a portion of its length and the wall of the female member having an opening 37 registering with said groove. The opening 37 also registers with one end of the opening 35 in the header plate.

The female guide member 33 of each header plate is disposed at one side of the center of the plate and the male guide member 32 at the other side thereof. Each male guide member is in the form of a hollow conical casting, as best shown in Fig. 5, and has along its length a rib or extension 38 which is adapted to enter the groove 36 in the female guide member of the opposing header plate and also enter or pass through the opening 37 in said member, and may, as shown in the drawing, enter or pass through the opening 35 in the header plate.

On the front or exposed face of each header plate a supporting ledge or table 39 is formed or secured, and spaced from and disposed above each supporting plate is a lug 40.

Conduit coupling heads 41 are positioned between the supporting ledge or table 39 and the lug 40 of each header plate, and a pivot bolt 42 passed through such parts and through the coupling heads 41.

The coupling elements are normally drawn inwardly toward or against the header plates; as will be described hereinafter; and while they may be formed in various ways, I have preferably shown them of substantially triangular shape with the pivot bolt 42 passing through one of the corners. The opposing or contacting faces of these coupling heads are disposed obliquely with respect to the longitudinal center of the cars, and in the particular construction shown each consists of two main parts 43, 44; 43 being a casting serving as a casing to receive the part 44, which is in the form of a removable sleeve screwthreaded into the casting and having an outstanding flange 45 at its outer end fitting into a depressed portion of part or member 43. At its inner end the sleeve is provided with an inwardly-directed annular flange 46 which may be chamfered, as shown, to form a valve seat for an inwardly-opening valve 47. This valve is provided with a valve stem 48 having a head 49.

51 is a spider seated against the flange 46, and through openings therein air, steam, or any other serving agent may pass when the valve is opened. Surrounding the valve stem 48 is a helical spring 52 bearing at one end against said spider and at the other end against said head; the spring serving to force the valve outwardly and cause it to be seated against the valve seat formed by the inwardly-extending annular flange 46.

At that side of the coupling head facing the header plate 29, said head is provided with a nipple 53 through which and the wall of the coupling head casing a passage is formed. The header plate 29 is provided with an opening 54 through which a hose or other flexible tubular element 55 is passed, this hose having connection in the usual manner with the air or steam pipe arranged underneath the car, and it is fastened to the nipple 53 of the coupling head 41 by means of wires 56, or otherwise. The flexibility of the hose or flexible tubular member 55 permits the coupling head to swing on its pivot bolt 42 while maintaining connection with the pipe underneath the car.

It is to be noted that each coupling head, and more particularly the sleeve 44, which may be termed a valve sleeve, is provided with an annular dove-tailed groove 57 in which a rubber or other gasket 58 is fitted, said gasket normally extending outwardly beyond the face of the valve sleeve or, as it may be termed, beyond the face of the coupling head.

When the coupling heads are disconnected, the helical springs 52 serve to close the valves 47 and cause the heads 49 on the outer end of the valve stems to be projected beyond the outer faces of the gaskets. It is also to be noted that the head is preferably rounded at the edges.

When the coupling heads are in normal positions, each is swung rearwardly toward or against the outer side of the header plate on which it is mounted; each header plate having a lug 59 formed thereon and each coupling head a lug 60, and to these lugs opposite ends of a retractile spring 61 are secured, said spring serving to draw the coupling head toward or against the header plate.

Extending forwardly from each header plate is an additional lug 62, to which is pivotally secured between its ends, a kicker lever 63, one end of said lever lying against the coupling head, as at 64, and the other extending normally into the female guide member through the opening 37 therein and being adapted to be engaged by the rib 38 on the male guide member of the header plate on the adjoining car when inserted into said female guide member.

Upon approach of two cars adapted to be coupled together in the usual way, the header plates 29 approach each other and the projecting male guide member 32 of each car is in alinement with the female guide member of the adjoining car whenever the two cars are on a straight-lined track, and therefore the male guide members enter the female guide members, and when substantially fully entered, the ribs on said male guide members enter the grooves in the female guide members; thus guarding against any tilting of the header plates upwardly or downwardly at opposite sides of the apparatus. The conduit coupling heads 41 are at such times in their normal positions with the engageable faces of the heads at opposing ends of the cars obliquely disposed. However, as the male guide members, and particularly the ribs 38 thereof, come in contact with the outer ends of the kicker levers 63, said levers are swung on their pivots, with the result that the inner ends of said levers are brought into action against the coupling heads and force said heads toward each other. This results in the heads 49 on the valve stems being brought in contact with each other and the gaskets 58 to be forced against each other and assure an air and steam tight joint between the coupling heads. When these gaskets are brought in contact with each other, the valves will be opened to allow the air or steam to pass from the pipe-line of one car into the pipe-line of the other.

It will be apparent therefore that the coupling of the hose or conduits of adjoining cars is accomplished automatically when the cars are coupled together by the usual couplers. During this coupling action the header plates are maintained in proper alinement by the retractile springs 28 in the guide frame 16, and they may be forced inwardly toward the ends of the car sills by reason of the yielding of the helical springs 25. When uncoupling the cars in the usual manner, the hose coupling heads will become automatically uncoupled or disengaged, one from the other. As the cars move away from each other, the helical springs 25 momentarily retain the parts carried by the supporting plates in their coupled relation. When, however, the springs 25 have fully recovered themselves, the male guide members 32 become withdrawn from the female guide members 33, and this results in the retractile springs swinging the coupling heads toward or against their respective header plates, at the same time returning the kicker levers 63 to normal positions.

In the event that the coupling of cars takes place on a switch, or curved portion, of the track, the male guide members will have their axes at an angle to the axes of the female guide members, and consequently the apices of the male guide members will strike the outwardly-flaring wall of the female guide members, and by said walls be directed centrally into and through said female guide members, with the result that the header plates will be brought into parallelism and the coupling heads coupled together in the same manner as occurs when the cars are in direct alinement. However, under such conditions the supporting rods 22 will be positioned at one side of the longitudinal centers of the guide frames 17; one of the retractile springs in each guide frame being under greater strain than the other. At such times, the header plates will be swung on said supporting rod, which is permitted by the pivot pins 31.

It is apparent therefore from the foregoing that the conduits or pipes, including the hose or flexible ends, under adjoining cars can be as readily coupled together when the cars are disposed at an angle to each other as when in direct alinement, and that automatic connection and disconnection of the conduits takes place without the attention of brakemen, switchmen, or trainmen, except such as is required to uncouple the couplers of adjoining cars when it is desired to separate them.

Having thus described my invention, what I claim is:

1. In combination with two cars having air or steam pipes, a triangular guide frame underneath each of said cars having a flaring opening at its inner end and a transverse slot at its outer end, a supporting rod passing through the flaring opening and the slot of each triangular guide, a spring surrounding each of said rods and serving to force them outwardly, a spring disposed between the sides of each of said supporting rods and fixed points of its triangular guide frame, a header plate pivotally secured to the outer end of each of said rods, a female guide member and a male guide member extending outwardly from each of said header plates, the male guide member of one of said header plates being adapted to enter the female guide member of the other so as to maintain said header plates and their supporting rods in central position underneath the cars, pivoted coupling heads having connection with said pipes and being provided with obliquely-disposed opposing faces, and means between the female guide member of the header plates and the coupling heads adapted to be actuated by the male guide members to cause said coupling heads to be pressed together in a fluid-tight manner.

2. In combination with two cars having air or steam pipes, a transverse header plate supported from each car having female and male guide members at opposite ends, a coupling head movably supported between the ends of each of said header plates, and means extending from each coupling head into each female guide member to be engaged by the male guide member of the adjacent car so as to force said coupling heads together, said coupling heads having connection with the pipes of both cars.

3. In combination with two cars having air or steam pipes, a header plate yieldingly and pivotally supported from each car, a conical male guide member secured to one end of each header plate and a female guide member provided with an outwardly-flaring opening at the opposite end of each header plate, the male guide member of each header plate being adapted to enter the female guide member of the other header plate, a coupling head pivotally connected to each header plate between the guide members thereon and having connection with the pipes of said car, a spring serving to draw each of said coupling heads inwardly, and a kicker element carried by each header plate adapted to be engaged by the male guide member on the adjacent car to force the coupling heads outwardly and couple the pipes of both cars in a fluid-tight manner.

4. In combination with two cars having air or steam pipes, a longitudinally yielding oscillatable header plate on each car, coupling heads carried by said header plate and connected to said pipes, a female guide member at one end of each header plate provided with an outwardly flaring opening having a groove along at least a portion of its length, and a conical male guide member at the opposite end of each header plate, the male guide member of each header plate being adapted to enter the female guide member of the other header plate, each male guide member having a rib adapted to fit into the groove of the female member in which it is entered.

5. In combination with two cars having air or steam pipes, a support on each car, a coupling head on each support connected with the pipe of the same car, a female guide member on each support extending outwardly toward the support of the adjoining car and having an outwardly flaring opening and an opening extending from said outwardly flaring opening to the outer side of said guide member, each support having also a conical male guide member adapted to enter the female guide member of the other support, and movable means interposed between the coupling heads and the tapered openings of said female guide members engageable by the male guide members to cause the coupling heads of both cars to be brought together.

6. In combination with two cars having air or steam pipes, a longitudinally-yielding support carried by each car, a coupling head pivotally secured to each support and adapted to be brought into contact with each other upon coupling said cars together, a pivoted kicker device on each car engaging the coupling head on the same car to force said coupling heads together, and means on each car engaging the kicker means of the other car to cause the same to be operated.

CHARLES W. IBACH.